(12) United States Patent
Shan et al.

(10) Patent No.: US 10,915,238 B2
(45) Date of Patent: Feb. 9, 2021

(54) DATA PROCESSING METHOD AND APPARATUS APPLIED TO ELECTRONIC MAP, AND MOBILE TERMINAL

(71) Applicant: BEIJING XINGXUAN TECHNOLOGY CO., LTD., Beijing (CN)

(72) Inventors: Jie Shan, Beijing (CN); Liuwu Kong, Beijing (CN); Lu Zhang, Beijing (CN)

(73) Assignee: BEIJING XINGXUAN TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/663,308

(22) Filed: Oct. 24, 2019

(65) Prior Publication Data

US 2020/0057553 A1 Feb. 20, 2020

Related U.S. Application Data

(63) Continuation of application No. PCT/CN2018/084645, filed on Apr. 26, 2018.

(30) Foreign Application Priority Data

Apr. 27, 2017 (CN) .......................... 2017 1 0286895

(51) Int. Cl.
*G06F 3/0484* (2013.01)
*G06Q 10/08* (2012.01)

(52) U.S. Cl.
CPC ...... *G06F 3/04847* (2013.01); *G06F 3/04845* (2013.01); *G06Q 10/083* (2013.01)

(58) Field of Classification Search
CPC .......................... G06F 3/04847; G06F 3/04845
See application file for complete search history.

(56) References Cited

U.S. PATENT DOCUMENTS

| | | | |
|---|---|---|---|
| 6,038,444 A | 3/2000 | Schipper et al. | |
| 2009/0249239 A1* | 10/2009 | Eilers | G06F 3/0486 715/769 |

(Continued)

FOREIGN PATENT DOCUMENTS

| | | |
|---|---|---|
| CN | 102708214 A | 10/2012 |
| CN | 104156357 A | 11/2014 |

(Continued)

OTHER PUBLICATIONS

PCT International Search Report and the Written Opinion dated Jul. 24, 2018, issued in related International Application No. PCT/CN2018/084645, with partial English translation (9 pages).

(Continued)

*Primary Examiner* — David E Choi

(57) ABSTRACT

A data processing method and apparatus applicable to an electronic map, and a mobile terminal are provided, relating to the field of electronic maps and data processing. The data processing method includes: detecting a user operation on an electronic map; obtaining operation data that reflects the user operation; determining, based on the operation data and an area that is configured based on the electronic map, whether the user operation is valid; and providing, based on a determination result of whether the user operation is valid, prompt information in response to the user operation. The disclosed technical solutions allow a user to flexibly and reasonably define an area based on an electronic map in real time, thereby improving user experience.

8 Claims, 5 Drawing Sheets

(56) References Cited

U.S. PATENT DOCUMENTS

| | | | |
|---|---|---|---|
| 2012/0235947 A1* | 9/2012 | Yano | G01C 21/3664 |
| | | | 345/173 |
| 2014/0095227 A1* | 4/2014 | Parker | G06Q 10/02 |
| | | | 705/5 |
| 2014/0163872 A1 | 6/2014 | Schilling et al. | |
| 2020/0057553 A1* | 2/2020 | Shan | G06F 3/0486 |
| 2020/0081553 A1* | 3/2020 | Sasaki | G06F 3/038 |

FOREIGN PATENT DOCUMENTS

| | | |
|---|---|---|
| CN | 105808693 A | 7/2016 |
| CN | 106446345 A | 2/2017 |
| CN | 107146049 A | 9/2017 |

OTHER PUBLICATIONS

PCT International Preliminary Report on Patentability dated Nov. 7, 2019, issued in related International Application No. PCT/CN2018/084645, with English translation (12 pages).

First Search dated Jun. 8, 2018, issued in related Chinese Application No. 201710286895.3 (2 pages).

First Office Action dated Jun. 20, 2018, issued in related Chinese Application No. 201710286895.3, with English machine translation (16 pages).

Second Office Action dated Sep. 7, 2018, issued in related Chinese Application No. 201710286895.3, with English machine translation (18 pages).

Third Office Action dated Nov. 12, 2018, issued in related Chinese Application No. 201710286895.3, with English machine translation (17 pages).

Supplemental Search dated Aug. 19, 2019, issued in related Chinese Application No. 201710286895.3 (2 pages).

Fourth Office Action dated Aug. 28, 2019, issued in related Chinese Application No. 201710286895.3, with English machine translation (8 pages).

Baidu Jingyan, "How do I quickly map the distribution of logistics couriers?", Aug. 3, 2016, with English machine translation.

SegmentFault, "Baidu Map Determines Whether the Polygonal Areas are Duplicated", Dec. 9, 2016, with Englishmachine translation..

* cited by examiner

DATA PROCESSING METHOD AND APPARATUS APPLIED TO ELECTRONIC MAP, AND MOBILE TERMINAL

CROSS-REFERENCE TO RELATED APPLICATION

This application is a continuation application of International Patent Application No. PCT/CN2018/084645, filed on Apr. 26, 2018, which is based on and claims priority to the Chinese Patent Application No. 201710286895.3, filed on Apr. 27, 2017 and entitled "DATA PROCESSING METHOD AND APPARATUS APPLIED TO ELECTRONIC MPA, AND MOBILE TERMINAL." The above-referenced applications are incorporated herein by reference in their entirety.

TECHNICAL FIELD

The present invention relates generally to the field of electronic maps and data processing, and more specifically, to a data processing method and apparatus applicable to an electronic map, and a mobile terminal.

BACKGROUND

Various online applications based on location-based service (LBS) are readily available on the market, and these applications have greatly facilitated people's travel and daily life. For some specific business such as take-out services, however, the delivery area of the business may need to be manually defined offline through the negotiation between a business owner and a product sales team of the application. Therefore the business owner may not be able to flexibly set or modify the delivery area, which adversely affects the user experience of the business owner.

SUMMARY

In view of the limitations described above, the present invention provides a data processing method and apparatus applicable to an electronic map, and a mobile terminal, to address the problem of existing technologies that a delivery area cannot be flexibly configured.

One aspect of the present invention is directed to a data processing method applicable to an electronic map. The method may include: detecting a user operation on an electronic map; obtaining operation data that reflects the user operation; determining, based on the operation data and an area that is configured based on the electronic map, whether the user operation is valid; and providing, based on a determination result of whether the user operation is valid, prompt information in response to the user operation.

In the aforementioned method, providing prompt information in response to the user operation may comprise: displaying, in response to a determination that the user operation is valid, an operable option for valid user operation on the electronic map. Determining, based on the operation data and an area that is configured based on the electronic map, whether the user operation is valid may comprise: determining, based on the operation data, a configurable area that is configured based on the electronic map, and a configured zone that is configured based on the electronic map, whether an added object or an dragged object is located inside the configurable area and outside the configured zone; and determining, in response to a determination that the added object or the dragged object is located inside the configurable area and outside the configured zone, the user operation is valid. The added object or the dragged object includes a node, a line, or a zone.

In some embodiments of the present invention, the user operation may include: adding an object or dragging an object.

In some embodiments of the present invention, the method may further include: configuring, based on a user location, the configurable area centered on the user location on the electronic map; and configuring, based on structured zone configuration data, the configured zone on the electronic map.

In some embodiments of the present invention, the structured zone configuration data may include area data, zone data, and node data. A single area datum may include at least one zone datum, and a single zone datum may include a plurality of node data.

In some embodiments of the present invention, the node data may include: current coordinates of a node, coordinates of the node before the user operation, an edge vector, and visual display data.

In some embodiments of the present invention, providing, based on a determination result of whether the user operation is valid, prompt information in response to the user operation may further include: displaying, in response to a determination that the user operation is invalid, an operable option for invalid user operation on the electronic map.

Another aspect of the present invention is directed to a data processing apparatus applicable to an electronic map. The apparatus may include: a detection module, an obtaining module, a determination module, and a response module.

The detection module may be configured to detect a user operation on an electronic map. The obtaining module may be configured to obtain operation data that reflects the user operation. The determination module may be configured to determine, based on the operation data and an area that is configured based on the electronic map, whether the user operation is valid. The response module may be configured to provide, based on a determination result of whether the user operation is valid, prompt information in response to the user operation.

In some embodiments of the present invention, the response module may comprise a first response submodule, configured to display, in response to a determination that the user operation is valid, an operable option for valid user operation on the electronic map. The determination module may be further configured to determine, based on the operation data, a configurable area that is configured based on the electronic map, and a configured zone that is configured based on the electronic map, whether an added object or an dragged object is located inside the configurable area and outside the configured zone. The added object or the dragged object includes a node, a line, or a zone.

The function may be implemented by hardware, or may be implemented by hardware executing corresponding software. The hardware or software may include one or more modules corresponding to the foregoing function.

In some embodiments of the present invention, a structure of the data processing apparatus may include a processor and a memory. The memory may be configured to store a program executable by the processor. The processor may be configured to execute the program stored in the memory to cause the data processing apparatus to perform the data processing method in any of the aforementioned embodiments. The data processing apparatus may further include a communication interface for the data processing apparatus to communicate with other devices or communication networks.

Another aspect of the present invention is directed to a computer storage medium for storing a computer software instruction used by the data processing apparatus. Upon being executed, the instruction may perform the data processing method of any of the aforementioned embodiments.

The embodiments of the present invention allows a user (for example, a business owner in the take-out order business) to flexibly and reasonably configure a delivery area on an electronic map in real time.

The above and other objectives, features, and advantages of the present invention will become more apparent after reading the exemplary embodiments in view of the accompanying drawings.

BRIEF DESCRIPTION OF THE DRAWINGS

To describe the technical solutions in the embodiments of the present invention more clearly, the following outlines the accompanying drawings to be used in the description of the embodiments of the present invention. Apparently, the accompanying drawings described below are merely some embodiments of the present invention, and a person of ordinary skill in the art may derive other drawings from these accompanying drawings without creative efforts.

DETAIL DESCRIPTION OF THE EMBODIMENTS

To make a person skilled in the art better understand the technical solutions of the present invention, a clear and detail description of the technical solutions in the embodiments of the present invention will be described below with reference to the accompanying drawings.

Some processes described in the specification, claims, and accompanying drawings of the present invention may include a plurality of operations in particular order. However, it is clearly understandable that such operations may be performed not in the order described herein or may be performed concurrently. Serial numbers of the operations such as 101 and 102 are merely used to distinguish between different operations, and do not represent any order of implementation. In addition, such processes may include more or fewer operations, and the operations may be performed sequentially or concurrently. It should be noted that the words such as "first" and "second" herein are used to distinguish between different messages, devices, modules, which neither represent an order nor imply a restriction that the "first" and the "second" represent different types.

The technical solutions in the embodiments of the present invention will be described clearly and in full below with reference to the accompanying drawings. Apparently, the described embodiments are merely some of but not all of the embodiments of the present invention. All other embodiments derived by a person skilled in the art based on the embodiments of the present invention without creative efforts shall fall within the protection scope of the present invention.

Figure 1:
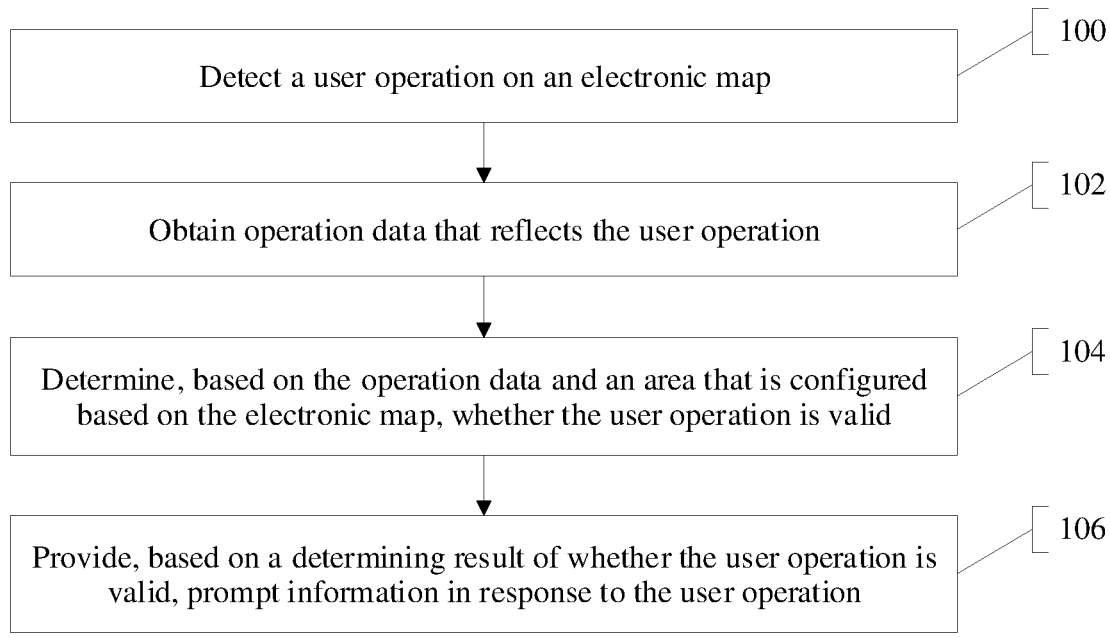
FIG. 1 is a schematic flowchart of a data processing method applicable to an electronic map in accordance with one embodiment of the present invention.

FIG. 1 is a schematic flowchart of a data processing method applicable to an electronic map in accordance with one embodiment of the present invention. Referring to FIG. 1, the method may include the following steps.

In step 100, a user operation on an electronic map may be detected.

In some embodiments, the user operation may include adding an object and dragging an object. Certainly, the user operation may further include deleting an object. For example, in a take-out order business, when defining a delivery area, an "object" may be a node, a line, or a zone.

In step 102, operation data that reflects the user operation may be obtained. In other words, the operation data may be a record of the user operation.

In step 104, based on the operation data and an area that is configured based on the electronic map, whether the user operation is valid may be determined.

In some embodiments, the area that is configured based on the electronic map may include: a configurable area that is configured on the electronic map based on a user location and centered on the user location. A valid user operation should be a user operation in the configurable area. The present invention does not specifically limit a shape of the configurable area.

In some embodiments, the area that is configured based on the electronic map may include not only the configurable area, but also a configured zone that is configured on the electronic map based on structured zone configuration data. The structured zone configuration data may include area data, zone data, and node data. A single area datum may include at least one zone datum, and a single zone datum includes a plurality of node data. The structured zone configuration data will be described below in detail.

In step 106, based on a determination result of whether the user operation is valid, prompt information may be provided in response to the user operation. For example, if the user operation is valid, an option that is operable when the user operation is valid (i.e., an operable option for valid user operation) may be displayed on the electronic map; if the user operation is invalid, an option that is operable when the user operation is invalid (i.e., an operable option for invalid user operation) may be displayed on the electronic map.

By using the method provided in this embodiment, the user can flexibly perform zone configuration based on the electronic map. For example, in the take-out order business, a business owner can flexibly and reasonably define a delivery area based on the electronic map in real time, which improves the user experience.

In some embodiments, step 104 may be implemented as follows. First, based on the operation data, a configurable area that is configured based on the electronic map, and a configured zone that is configured based on the electronic map, whether the added object or the dragged object is located inside the configurable area and outside the configured zone may be determined. The configured zone that is configured based on the electronic map may be absent (that is, not configured). In that case, it is equivalent to only determining whether the added object or the dragged object is located inside the configurable area.

In some embodiments, step 104 may include one or more of the following operations: determining, based on data of a node added by a user and the configurable area that is configured based on the electronic map, whether the added node is located inside the configurable area (an operation related to the added node may be valid only when the added node is located inside the configurable area); determining, based on the configurable area and the configured zone that are configured based on the electronic map and the data of the node that is added by the user, whether the added node is located inside the configurable area and outside the configured zone (if so, the added node is determined to be valid). A single line or a single node may also be considered as a configured zone, and in that case, if the added node does not coincide with the single node or the single line, the added node is determined to be located outside the configured zone.

Step 104 may also include one or more of the following operations: determining, based on a line created by the user (for example, by creating two nodes and connecting them into a line) and the configured zone that is configured based on the electronic map, whether the created line intersects a line (such as a boundary of the zone) in the configured zone (if they do not intersect, the created line is determined to be valid), wherein the validity of the created line can serve as a basis for determining the validity of a to-be-closed zone formed by the line; and determining, based on the to-be-closed zone created by the user and the configured zone that is configured based on the electronic map, whether the to-be-closed zone encompasses a node inside the configured zone (if such a node does not exist, the created to-be-closed zone is determined to be valid).

Figure 2:
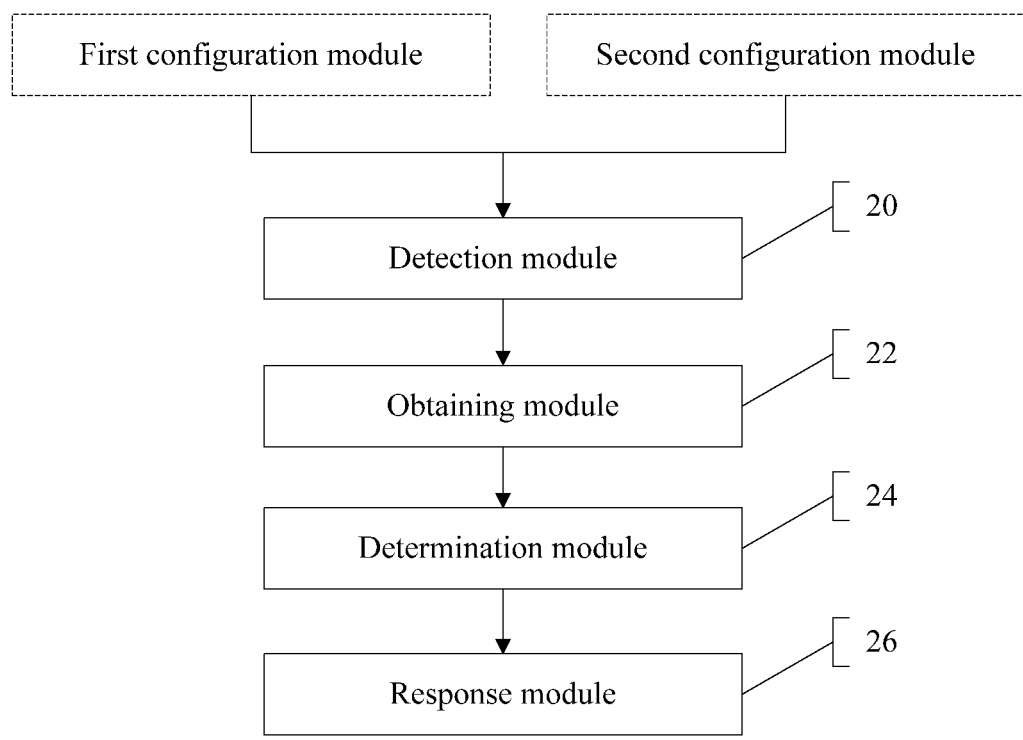
FIG. 2 is a block diagram of a data processing apparatus applicable to an electronic map in accordance with one embodiment of the present invention.

FIG. 2 is a block diagram of a data processing apparatus applicable to an electronic map in accordance with one embodiment of the present invention. Referring to FIG. 2, the data processing apparatus may include a detection module 20, an obtaining module 22, a determination module 24, and a response module 26. These modules will be described below in detail.

In some embodiments, the detection module 20 may be configured to detect a user operation on an electronic map. The user operation may be, for example, adding an object, deleting an object, or dragging an object. The obtaining module 22 may be configured to obtain operation data that reflects the user operation. The determination module 24 may be configured to determine, based on the operation data and an area that is configured based on the electronic map, whether the user operation is valid. The response module 26 may be configured to provide, based on a determination result of whether the user operation is valid, prompt information in response to the user operation.

With the data processing apparatus provided in this embodiment, a user may flexibly and reasonably configure the electronic map (e.g., defining a delivery zone) based on the user operation in real time.

In some embodiments, the determination module 24 may be configured to: determine, based on the operation data and a configurable area that is configured based on the electronic map, whether the added object or the dragged object is located inside the configurable area. The determination module 24 may also be configured to: determine, based on the operation data, a configurable area that is configured based on the electronic map, and a configured zone that is configured based on the electronic map, whether the added object or the dragged object is located inside the configurable area and outside the configured zone.

In some embodiments, as shown by dashed-line boxes in FIG. 2, the data processing apparatus may further include a first configuration module and a second configuration module. The first configuration module may be configured to configure, based on a user location, the configurable area centered on the user location with a preset radius on the electronic map. The second configuration module may be configured to configure the configured zone on the electronic map based on structured zone configuration data. The structured zone configuration data may include area data, zone data, and node data. A single area datum may include at least one zone datum, and a single zone datum may include a plurality of node data. The node data may include: current coordinates of a node, coordinates of the node before the user operation, an edge vector, and visual display data.

In some embodiments, the response module 26 may include a first response submodule and a second response submodule. The first response submodule may be configured to display (e.g., by highlighting or emphasizing), in response to a determination that the user operation is valid, an option that is operable when the user operation is valid (i.e., an operable option for valid user operation) on the electronic map. The second response submodule may be configured to display, in response to a determination that the user operation is invalid, an option that is operable when the user operation is invalid (i.e., an operable option for invalid user operation) on the electronic map.

The method and the apparatus according to the embodiments of the present invention are described above in detail with reference to accompanying drawings. Exemplary implementations of some contents of the present invention will be described, from perspectives of design and application, in detail below with reference to accompanying drawings.

User Interaction

In an example of using the data processing method and apparatus based on an electronic map in accordance with the embodiments of the present invention, in the take-out order business, a delivery area may be configured by accessing software that has a function of an electronic map and that supports editing delivery area on the electronic map.

With respect to user interaction, a shortcut bar may be displayed on the top of a home interface of the software. For example, the shortcut bar may include operation options such as Undo, Clear, Close, and Save. Depending on data status, an operation option may be displayed in an enabled state or a disabled state. Specifically, the data status may include the following four cases. (1) When no delivery area is configured, all the operation options are grayed out and not operable. (2) When a user clicks on the map, a node may be formed at a clicked location (if the user clicks on a plurality of locations successively, nodes are connected in tandem to form sides of a polygon). In this case, Undo and Clear buttons are highlighted and enabled. However, if there is only one side or one node that is not enough to form a zone, Close and Save buttons are disabled. (3) When a plurality of (e.g., three or more) nodes are configured, the Close button may be highlighted to indicate to the user that closing is enabled, but the Save button may still be disabled because no complete zone is formed at this time. (4) Finally, when the user clicks the Close button, a defined zone may be covered by a mark color, the Close button may be grayed out, and the Save button may be highlighted. Steps (1) to (4) may constitute a zone defining process.

In performing the foregoing process or method, text prompts and button highlighting may be provided to guide the user during the operation.

Data Structure

Figure 3:
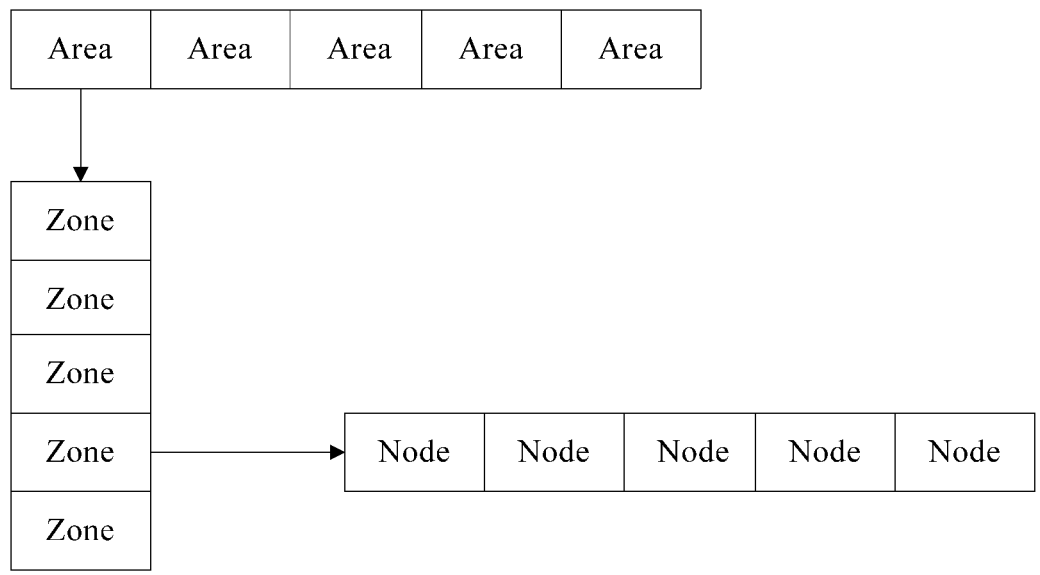
FIG. 3 is a schematic diagram of a data structure in accordance with one embodiment of the present invention.

To implement the foregoing guidance process, a three-level storage structure of area-zone-node may be used as a data structure. Specifically, as shown in FIG. 3, data may be organized by using a nested list. Each element in an outer list may represent an area. Each area may also be a list, in which each element may represent a zone. Each zone may include all nodes that make up the zone. Each node may include a set of latitude and longitude, and these nodes may be arranged sequentially.

In this embodiment, a node structure may be a defining and displaying unit at the finest level, and is the smallest unit with independent functions. In the node structure, relationships between nodes (i.e., relationships of sides) may be denoted by directional vectors.

Figure 4:
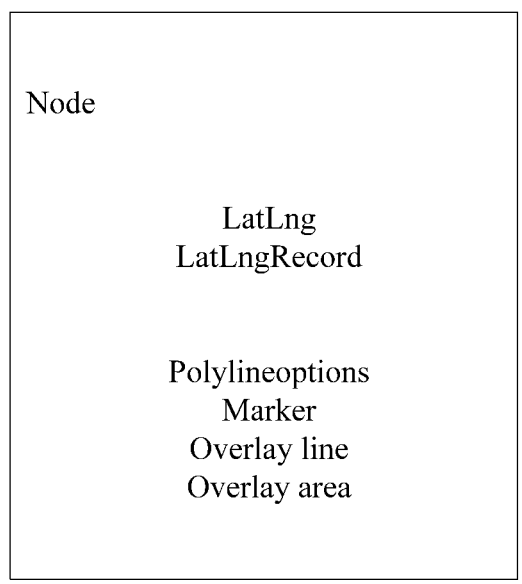
FIG. 4 is a schematic storage diagram of a node structure shown in FIG. 3.

FIG. 4 shows a node structure in one example. In the node structure of FIG. 4, LatLng represents a data object containing latitude and longitude, LatLngRecord represents a record of latitude and longitude objects, Polylineoptions represents a configuration for drawing a boundary, Marker represents a landmark point, Overlay line represents a landmark line; and Overlay area represents a landmark zone.

In summary, a node according to an embodiment of the present invention may record the following types of data: current coordinates, last recorded coordinates, an edge vector pointing to a previous node, and layer elements such as nodes, lines, and planes. The three types of data are respectively used for different functions. That is, these three types of data may be used to represent a geographic location status, an abstract boundary, and visual layer display, respectively. They are used for different control functions in the foregoing interaction logic.

Validity Check on Possible Down-Going Data

For down-going data (e.g., data from a third party, or initial data), the data may first be structured, and may be generalized into a three-level (area-zone-node) concept. In a configured logic, it may be stipulated that one business can configure a maximum of five areas, and a maximum of five zones can be defined in each area. Zones cannot overlap with each other. Specifically, a plurality of zones in a same area may not overlap, and no zones in different areas are allowed to overlap. In addition, all zones may stay within a specified maximum reasonable area.

In validity check, if the down-going data does not satisfy any of the foregoing conditions, the data can only be displayed, and a yellow warning bar may be shown to indicate the invalidity. No other operation may be allowed.

Figure 5:
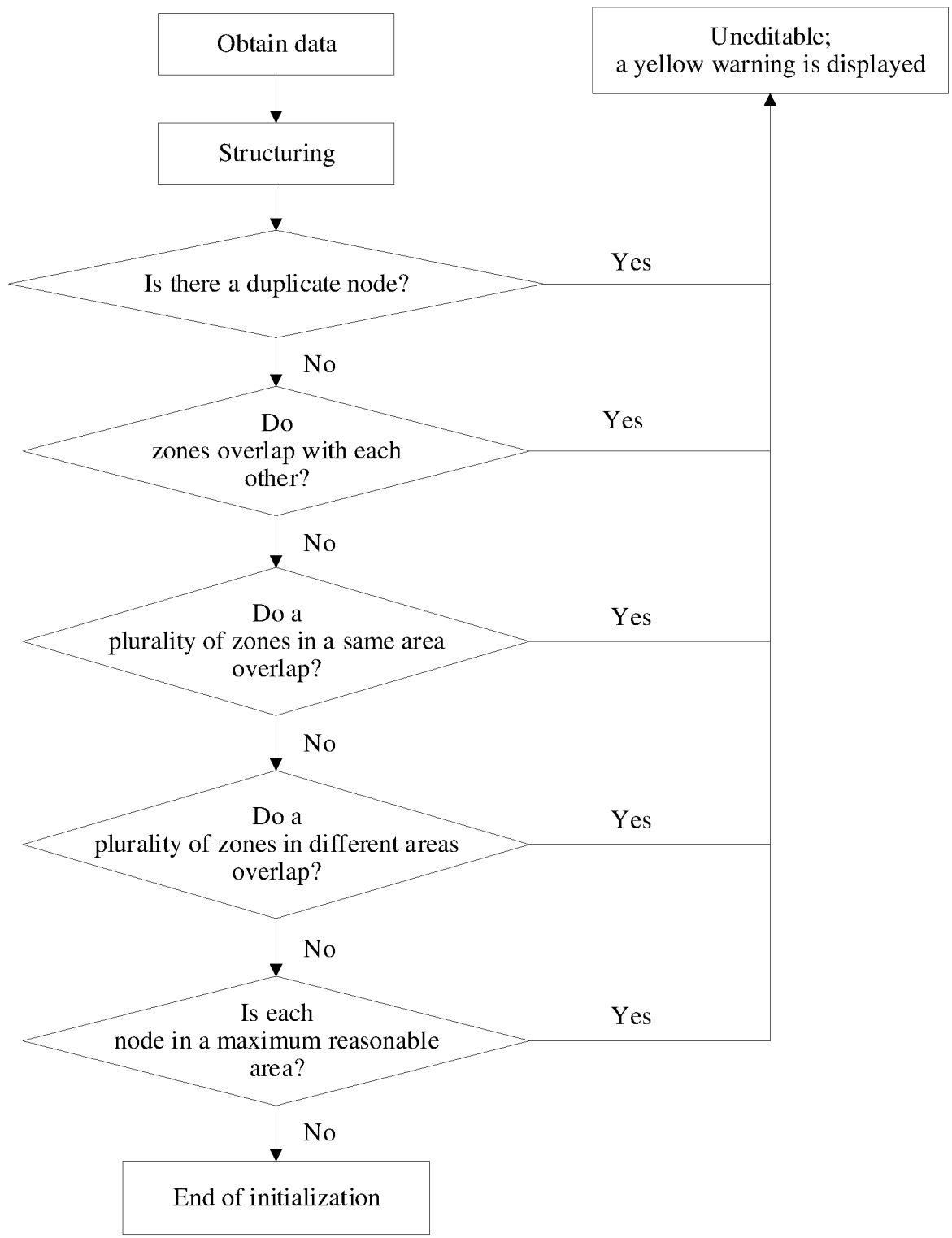
FIG. 5 is a schematic flowchart of validity check on delivered data in accordance with one embodiment of the present invention.

FIG. 5 shows a process of validity check in one example. The process may include: obtaining data and structuring the data; determining, respectively, whether there are duplicate nodes, whether the zones overlap with each other, whether a plurality of zones in a same area overlap, whether a plurality of zones in different areas overlap, and whether each point is within the maximum reasonable area. If a result of any of the foregoing determining operations is positive, the configuration is not allowed, and a yellow warning may be displayed. If results of all the foregoing determining operations are negative, the initialization is completed, and a configured zone may be displayed on the map for subsequent processing.

Real-Time Validity Check of User Operation

After the down-going data is structured and checked for validity, the user may be allowed to perform user operations, and validity of each operation may be checked in real time. User operations may fall into two types: add and drag.

Figure 6:
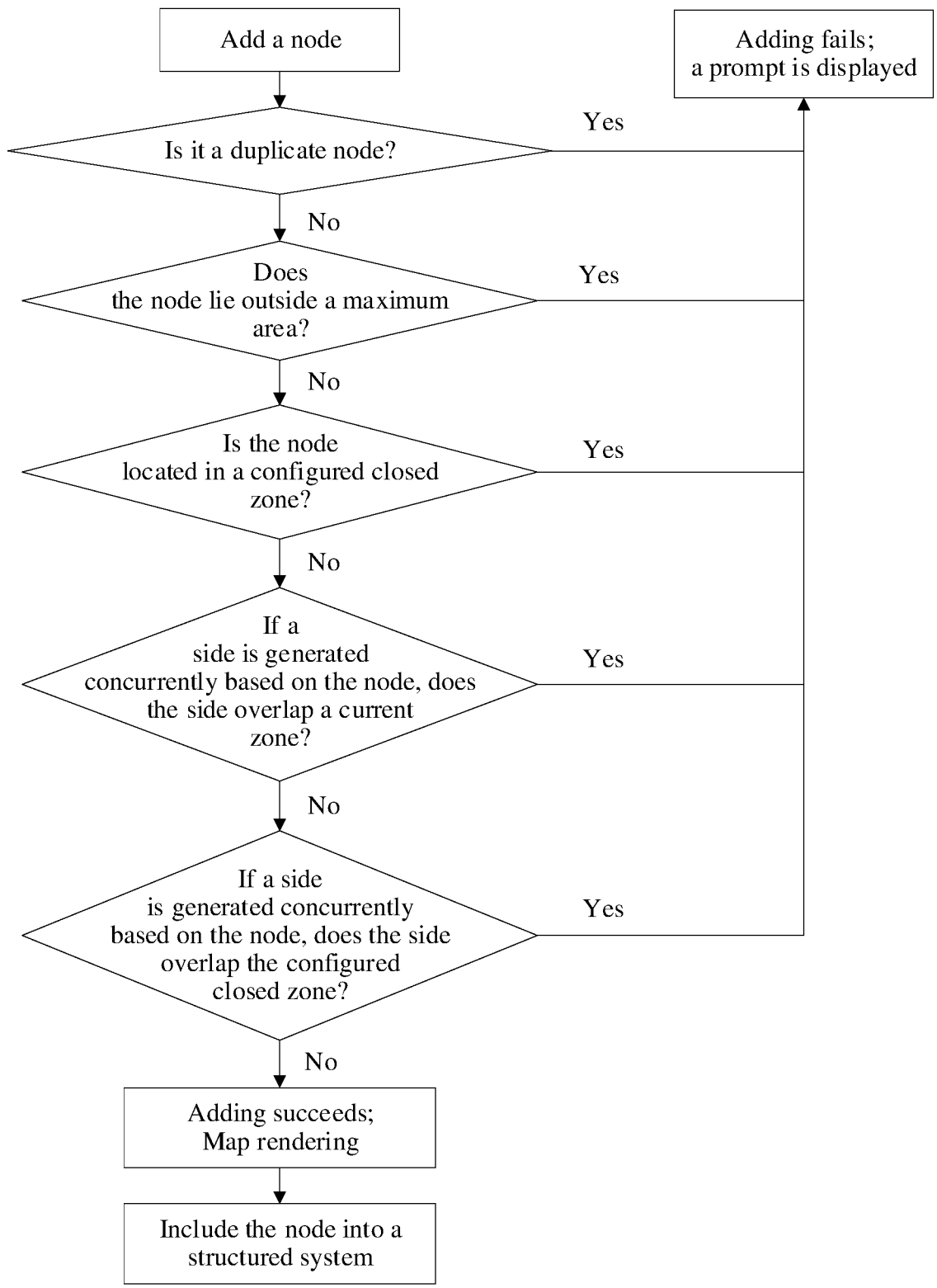
FIG. 6 is a schematic flowchart of validity check in an add operation in accordance with one embodiment of the present invention.

FIG. 6 shows a process of validity check for an "add" operation. The process may include the following steps. First, the user may add a node. Then, the operation may be checked to determine, respectively, whether the node is a duplication (e.g., overlaps an existing node or line), whether the node lies outside a maximum area, whether the node is in a configured closed zone, and, if a side is generated concurrently based on the node, whether the side overlaps a current zone (i.e., whether the side overlaps a side or node of the zone in which the generated side is located). If a side is generated concurrently based on the node, it may also be determined that whether the side overlaps a configured closed zone. If a result of any of the foregoing determining operations is positive, the adding of the node fails and a failure prompt is displayed. If results of all the determining operations are negative, the node is added successfully, the map is rendered, and data of the added node is included into the data structure mentioned above.

More specifically, when a user clicks to form a node, the validity of the node may be determined by determining, respectively, whether the node coincides with an existing node in the structure, whether the node is located in an area centered on the business with a maximum reasonable radius, and whether the node is located in another closed zone.

When the user connects nodes into a line, the validity of a boundary may be determined by determining, respectively, whether a boundary line intersects another boundary (no matter whether the another boundary belongs to a current zone or another zone).

When the user closes the zone, whether the zone can be closed is determined by determining whether a last side of the zone to be closed is valid; and checking whether a node of another zone is in the zone to be closed.

Figure 7:
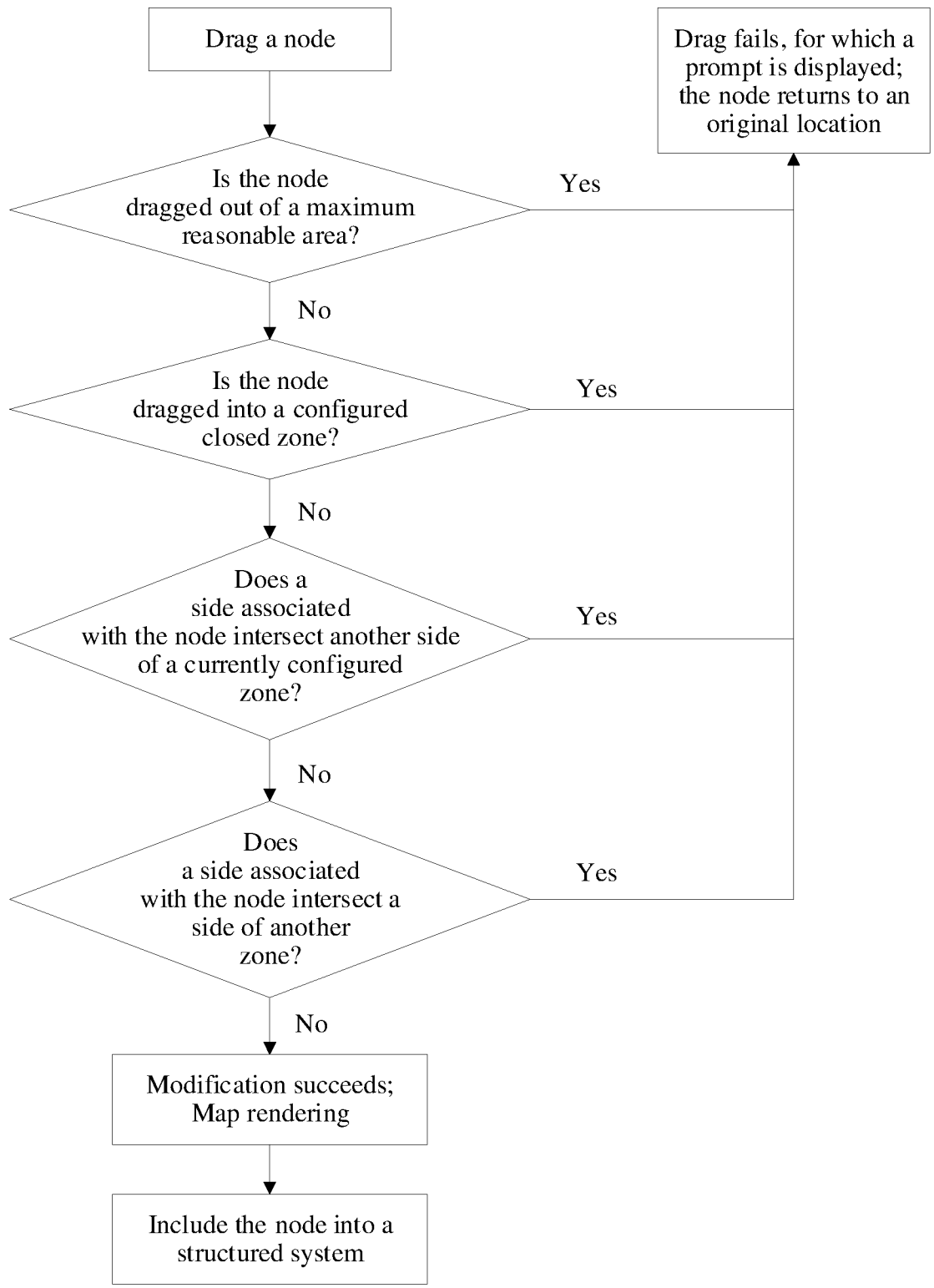
FIG. 7 is a schematic flowchart of validity check in a drag operation in accordance with one embodiment of the present invention.

FIG. 7 shows a process of the validity check in a drag operation. The process may include the following steps. First, a user may drag a node. Then, the operation may be checked to determine, respectively, whether a destination of the drag lies outside a maximum reasonable area, whether the node is dragged into a configured closed zone, whether a side associated with the node intersects another side of a currently configured zone, and whether the side associated with the node intersects a side of another zone. If a result of any of the foregoing determining operations is positive, the drag fails, a failure prompt is displayed, and the node returns to a location at which it resides before the drag. If results of all the determining operations are negative, the node is modified (dragged) successfully, the map is rendered, and data of the dragged node may be included into the data structure mentioned above.

For returning the location of the node after the drag, a current location and a previous location of the dragged node may be stored in the node structure. Thus, when the user drags the boundary, the foregoing steps are repeated to dynamically determine whether the drag operation is valid. If the drag operation is invalid, the side returns to its original state based on the location of the node.

To ensure visual coherence in the dragging process and ensure good user experience, a callback method provided by the Baidu map application interface may be used to continuously refresh the rendered layer and update a corresponding layer record in the node structure during the dragging process.

Interface Display

For configured zones (including nodes, lines, and closed zones), an editable zone in a current area may be displayed differently from editable zones in other areas. For example, zones in areas may be distinguished by using different colors and transparencies. In one example, when the data of the current configured zone is checked and determined to be valid, the current configured zone may be displayed in red translucence, and the boundary of the current configured zone may be displayed as a solid-line box of the same color. The zones in the other areas may be displayed as polygons without boundaries or drag points. In addition, endpoints of the current configured zone may be configured as draggable (e.g., the endpoints are explicitly identified). When the data of the current configured zone is checked and determined to be invalid, the current configured zone may be displayed in blue with a boundary, and the zones in the other areas may be displayed without boundaries nor draggable points.

In some embodiments, the data processing apparatus (e.g., a computer device, a mobile terminal, or a special-purpose device) provided in the embodiments of the present invention may further include a processor and a memory. The memory may be configured to store a program that are executable by the processor to perform the data processing method in the embodiment shown in FIG. 1. The processor may be configured to execute the program stored in the memory.

The program may include one or more computer instructions, and the one or more computer instructions may be executed by the processor. The processor may be configured to execute the computer instructions to perform the operations. The operations may include: detecting a user operation on an electronic map; obtaining operation data that reflects the user operation; determining, based on the operation data and an area that is configured based on the electronic map, whether the user operation is valid; and provide, based on a determination result of whether the user operation is valid, prompt information in response to the user operation.

Relevant parts in the foregoing description about the method embodiments, implementations of the method embodiments, and various examples, may be referred to for detail description of the operations, which will not be repeatedly described herein.

The present invention further provides a computer storage medium storing one or more computer software instructions used by the data processing device. The computer instructions may be executed to perform the data processing method applicable to an electronic map, as described in any of the foregoing embodiments.

A person skilled in the art is clearly aware that for convenience and brevity of description, a detailed working process of the apparatus and modules described above may be learned by referring to the corresponding process in the foregoing method embodiment, and is not repeated herein.

The apparatus embodiments described above are merely examples. The units described as discrete parts may be physically separated or not, and parts displayed as units may be physical units or not, may be located in one place or distributed on a plurality of network units. Some or all of the modules may be selected according to actual needs to achieve the objectives of the solution of this embodiment. A person of ordinary skill in the art can understand and implement the solution without creative efforts.

According to the embodiments described above, a person skilled in the art clearly understands that all the embodiments may be implemented by using software in combination with a necessary universal hardware platform, or by using hardware. Based on such an understanding, the foregoing technical solutions essentially or the part contributing to the prior art may be implemented in a form of a software product. The computer software product may be stored in a computer-readable storage medium such as a ROM/RAM, a magnetic disk, or an optical disc, and may include several instructions that enable a computer device (which may be a personal computer, a server, a network device, or the like) to perform the methods described in the foregoing embodiments or in some parts of the embodiments.

Finally, it should be noted that the foregoing embodiments are merely intended for describing but not limiting the technical solutions of the present invention. Although the present invention is described in detail with reference to the foregoing embodiments, a person of ordinary skill in the art should understand that they may still make modifications to the technical solutions described in the foregoing embodiments or make equivalent replacements to some technical features thereof, and such modifications and replacements do not cause the essence of the corresponding technical solutions to depart from the spirit or scope of the technical solutions of the embodiments of the present invention.

What is claimed is:

1. A data processing method applicable to an electronic map, comprising:
   detecting a user operation on an electronic map;
   obtaining operation data that reflects the user operation;
   determining, based on the operation data and an area that is configured based on the electronic map, whether the user operation is valid;
   providing, based on a determination result of whether the user operation is valid, prompt information in response to the user operation,
   wherein providing prompt information in response to the user operation comprises:
      displaying, in response to a determination that the user operation is valid, an operable option for valid user operation on the electronic map,
   and wherein determining, based on the operation data and an area that is configured based on the electronic map, whether the user operation is valid comprises:
      determining, based on the operation data, a configurable area that is configured based on the electronic map, and a configured zone that is configured based on the electronic map, whether an added object or an dragged object is located inside the configurable area and outside the configured zone, wherein the added object or the dragged object includes a node, a line, or a zone; and
      determining, in response to a determination that the added object or the dragged object is located inside the configurable area and outside the configured zone, the user operation is valid;
   configuring, based on a user location, the configurable area centered on the user location on the electronic map; and
   configuring, based on structured zone configuration data, the configured zone on the electronic map, wherein the structured zone configuration data comprises area data, zone data, and node data, a single area datum comprises at least one zone datum, and a single zone datum comprises a plurality of node data, and
   wherein the node data comprises current coordinates of a node, coordinates of the node before the user operation, an edge vector, and visual display data.

2. The method of claim 1, wherein the user operation comprises:
   adding an object or dragging an object.

3. The method of claim 1, wherein providing, based on a determination result of whether the user operation is valid, prompt information in response to the user operation further comprises:
  displaying, in response to a determination that the user operation is invalid, an operable option for invalid user operation on the electronic map.

4. A data processing apparatus applicable to an electronic map, comprising:
  a detection module, configured to detect a user operation on an electronic map;
  an obtaining module, configured to obtain operation data that reflects the user operation;
  a determination module, configured to determine, based on the operation data and an area that is configured based on the electronic map, whether the user operation is valid; and
  a response module, configured to provide, based on a determination result of whether the user operation is valid, prompt information in response to the user operation,
  wherein the response module comprises a first response submodule, configured to display, in response to a determination that the user operation is valid, an operable option for valid user operation on the electronic map,
  and wherein the determination module is further configured to determine, based on the operation data, a configurable area that is configured based on the electronic map, and a configured zone that is configured based on the electronic map, whether an added object or an dragged object is located inside the configurable area and outside the configured zone, wherein the added object or the dragged object includes a node, a line, or a zone;
  a first configuration module, configured to configure, based on a user location, the configurable area centered on the user location with a preset radius on the electronic map; and
  a second configuration module, configured to configure, based on structured zone configuration data, the configured zone on the electronic map,
  wherein the structured zone configuration data comprises area data, zone data, and node data, a single area datum comprises at least one zone datum, and a single zone datum comprises a plurality of node data, and
  wherein the node data comprises current coordinates of a node, coordinates of the node before the operation, an edge vector, and visual display data.

5. The apparatus of claim 4, wherein the user operation comprises: adding an object or dragging an object.

6. The apparatus of claim 4, wherein the response module further comprises:
  a second response submodule, configured to display, in response to a determination that the user operation is invalid, an operable option for invalid user operation on the electronic map.

7. A mobile terminal, comprising a processor and a memory, wherein the memory is configured to store one or more computer instructions executable by the processor, and the processor is configured to execute the one or more computer instructions to perform a data processing method applicable to an electronic map, wherein the data processing method comprises:
  detecting a user operation on an electronic map;
  obtaining operation data that reflects the user operation;
  determining, based on the operation data and an area that is configured based on the electronic map, whether the user operation is valid;
  providing, based on a determination result of whether the user operation is valid, prompt information in response to the user operation,
  wherein providing prompt information in response to the user operation comprises:
    displaying, in response to a determination that the user operation is valid, an operable option for valid user operation on the electronic map,
  and wherein determining, based on the operation data and an area that is configured based on the electronic map, whether the user operation is valid comprises:
    determining, based on the operation data, a configurable area that is configured based on the electronic map, and a configured zone that is configured based on the electronic map, whether an added object or an dragged object is located inside the configurable area and outside the configured zone, wherein the added object or the dragged object includes a node, a line, or a zone; and
    determining, in response to a determination that the added object or the dragged object is located inside the configurable area and outside the configured zone, the user operation is valid;
  configuring, based on a user location, the configurable area centered on the user location on the electronic map; and
  configuring, based on structured zone configuration data, the configured zone on the electronic map, wherein the structured zone configuration data comprises area data, zone data, and node data, a single area datum comprises at least one zone datum, and a single zone datum comprises a plurality of node data, and
  wherein the node data comprises current coordinates of a node, coordinates of the node before the user operation, an edge vector, and visual display data.

8. A non-transitory computer storage medium storing one or more computer instructions, wherein upon being executed, the computer instructions perform a data processing method comprising:
  detecting a user operation on an electronic map;
  obtaining operation data that reflects the user operation;
  determining, based on the operation data and an area that is configured based on the electronic map, whether the user operation is valid;
  providing, based on a determination result of whether the user operation is valid, prompt information in response to the user operation,
  wherein providing prompt information in response to the user operation comprises:
    displaying, in response to a determination that the user operation is valid, an operable option for valid user operation on the electronic map,
  and wherein determining, based on the operation data and an area that is configured based on the electronic map, whether the user operation is valid comprises:
    determining, based on the operation data, a configurable area that is configured based on the electronic map, and a configured zone that is configured based on the electronic map, whether an added object or an dragged object is located inside the configurable area and outside the configured zone, wherein the added object or the dragged object includes a node, a line, or a zone; and determining, in response to a determination that the added object or the dragged object is located inside the configurable area and outside the configured zone, the user operation is valid;

configuring, based on a user location, the configurable area centered on the user location on the electronic map; and configuring, based on structured zone configuration data, the configured zone on the electronic map, wherein the structured zone configuration data comprises area data, zone data, and node data, a single area datum comprises at least one zone datum, and a single zone datum comprises a plurality of node data, and wherein the node data comprises current coordinates of a node, coordinates of the node before the user operation, an edge vector, and visual display data.

* * * * *